Figure 1:
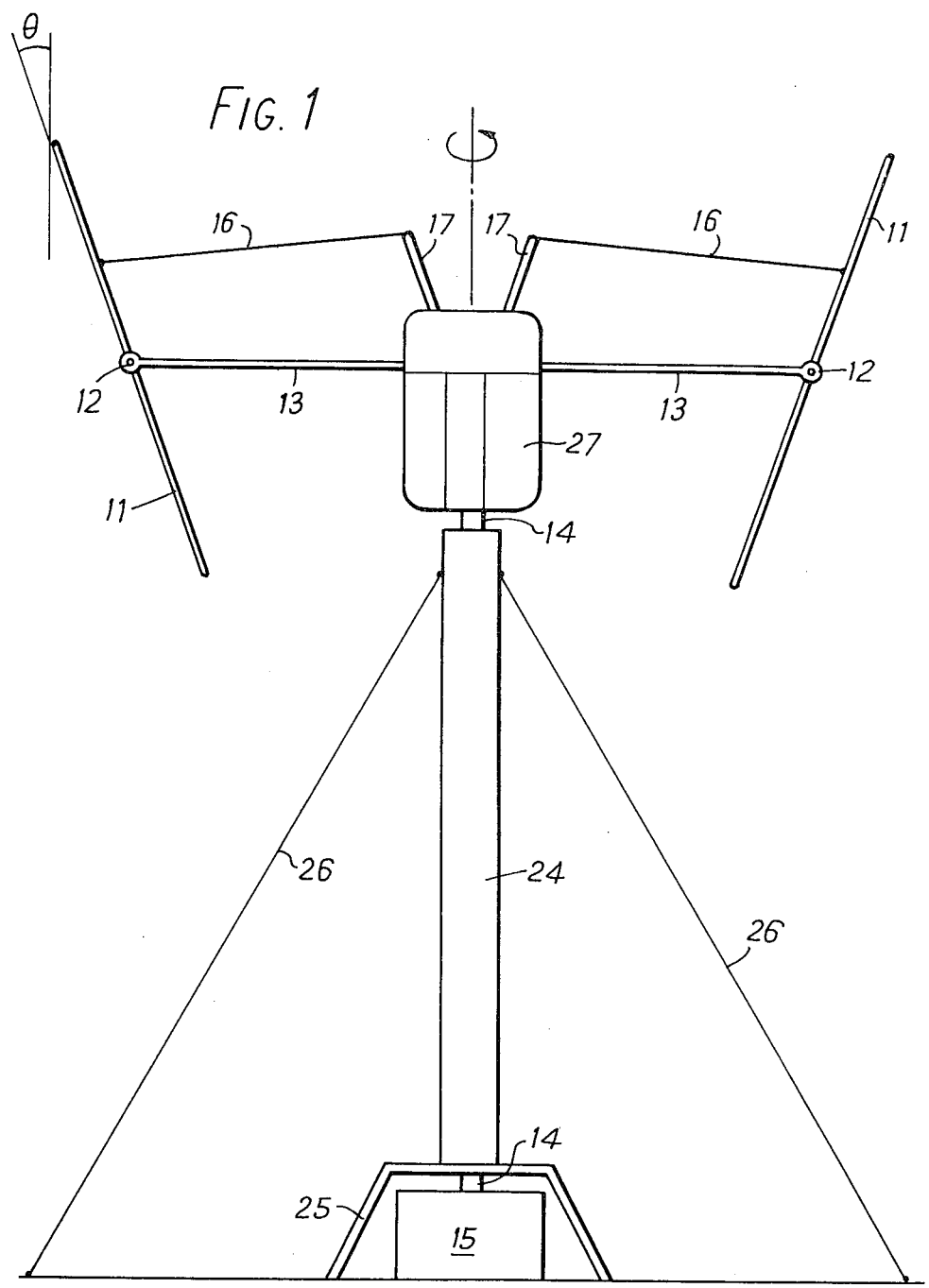

United States Patent [19]

Musgrove

[11] 4,087,202

[45] May 2, 1978

[54] VERTICAL AXIS WIND TURBINES

[75] Inventor: Peter James Musgrove, Reading, England

[73] Assignee: National Research Development Corporation, London, England

[21] Appl. No.: 706,696

[22] Filed: Jul. 19, 1976

[30] Foreign Application Priority Data

Jul. 21, 1975 United Kingdom ............... 30369/75

[51] Int. Cl.² .............................................. F03D 7/06
[52] U.S. Cl. ...................................... 416/41; 416/117; 416/132 B; 416/135; 416/44
[58] Field of Search ............ 416/142, 40, 41, 117-119, 416/44, 51, 89, 138, 87, 140, 132 B, 135, 137

[56] References Cited

U.S. PATENT DOCUMENTS

| 419,024 | 1/1890 | Straw | 416/139 |
| 667,965 | 2/1901 | Barwis | 416/117 |
| 873,460 | 12/1907 | Sakovitch | 416/117 |
| 1,443,912 | 1/1923 | Dominguez | 416/118 |
| 2,044,794 | 6/1936 | Kisevalter | 416/119 X |

FOREIGN PATENT DOCUMENTS

| 714,918 | 11/1931 | France | 416/119 |
| 860,930 | 12/1952 | Germany | 416/119 |
| 448,133 | 3/1950 | Italy | 416/119 |
| 735,111 | 8/1955 | United Kingdom | 416/139 |
| 150,066 | 6/1961 | U.S.S.R. | 416/41 |

Primary Examiner—Everette A. Powell, Jr.
Attorney, Agent, or Firm—Henry M. Bissell

[57] ABSTRACT

A vertical axis wind turbine comprises one or more aerofoil section blades attached to a support structure. The blade has at least one part thereof which is acted on by centrifugal forces as the blade rotates with the support structure and thereby caused to increase its angle of inclination to the said vertical axis when the speed of rotation increases beyond the normal operating range, whereby the rate of increase of rotational speed with wind speed is reduced.

16 Claims, 7 Drawing Figures

U.S. Patent  May 2, 1978  Sheet 4 of 4  4,087,202
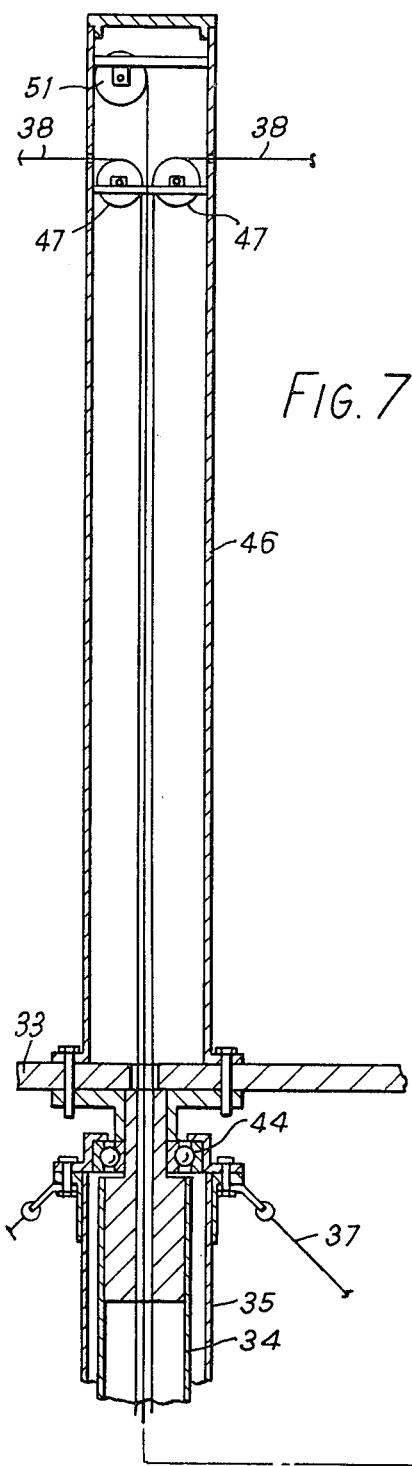
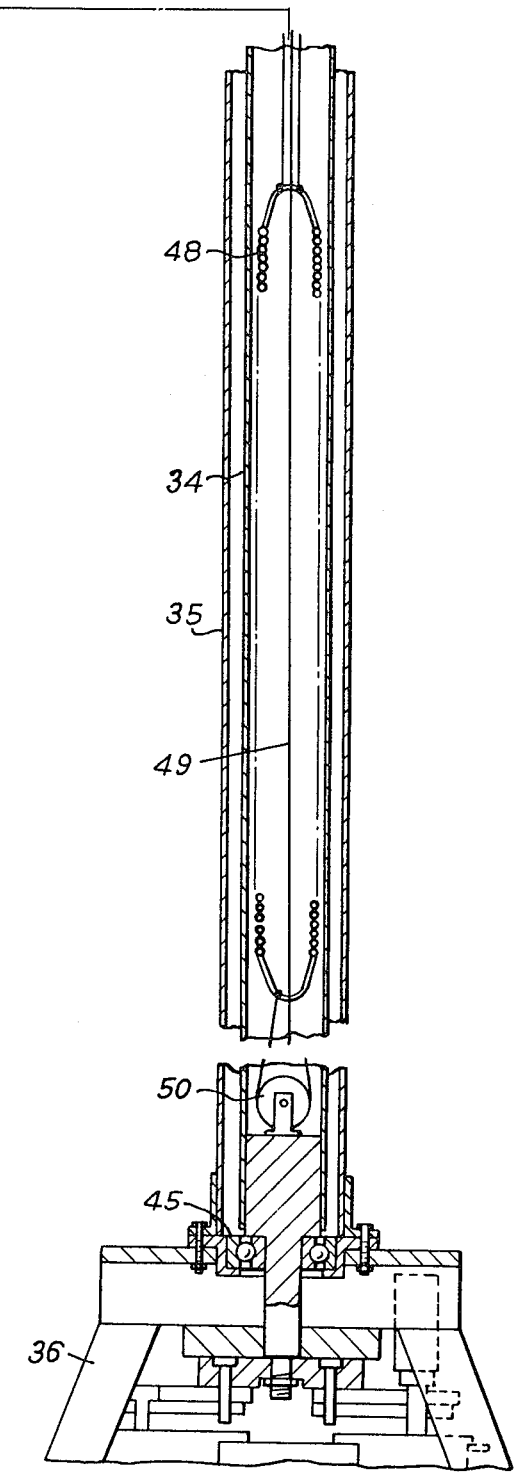
FIG. 7

VERTICAL AXIS WIND TURBINES

The present invention relates to vertical axis wind turbines.

Such wind turbines or windmills can be used to extract power from the wind by driving electrical generators or mechanical machines such as pumps. Vertical axis wind turbines have the advantage over horizontal axis wind turbines that they do not require orientation into the prevailing wind. A vertical axis wind turbine was proposed by G.J.M. Darrieus in U.S. Pat. No. 1,835,018, Dec. 8, 1931, and a similar turbine has been developed independently at the National Research Council, Ottawa, Canada, see "Agricultural Engineer", February 1974, pp. 14 to 16, article by P. South and R.S. Rangi and reports by the same authors for National Research Council of Canada LTR-LA-74, March 1971 and LTR-LA-105, September 1972.

In this prior design two or three blades of symmetrical aerofoil section are attached at their upper and lower ends to a shaft which rotates about a vertical axis and their length is curved to the shape which would be assumed by a perfectly flexible cable of uniform density and cross-section if it were spun about a vertical axis. This shape, which is designated troposkien is adopted to minimise bending stresses in the blades because it is a feature of vertical axis wind turbines that the blade speed must be considerably in excess of the wind speed and consequently at high wind speeds very high rotational speeds may occur and large centrifugal forces are then developed. The tropskien shape is clearly difficult and expensive to manufacture. Even if bending stresses are minimised the tensional stress developed in high winds if the rotational speed were allowed to increase without limit could lead to destruction of the turbine and would require the use of special high-strength materials. To avoid this difficulty air brakes are fitted but these add to the complexity of the structure and thus to its expense.

The problem underlying the present invention is to reduce the blade stresses occurring in a vertical axis wind turbine at high wind speeds without adding to the complexity and expense of the structure by the provision of special blade shapes and/or air brakes.

In accordance with the invention a vertical axis wind turbine comprising one or more aerofoil section blades attached to a support structure mounted for rotation about a vertical axis is characterised in that the or each blade has a single point of attachment to the support structure and at least part of the length of the blade has an angle of inclination to the axis which increases by the action of centrifugal forces as the speed of rotation increases.

In a preferred form each blade is hinged to the support structure to swing about the hinge axis under the action of the centrifugal forces. Control of this swinging movement is effected by a spring bias. In a convenient arrangement the hinge is between the ends of each blade and the upper ends of the blades swing outwards against the action of tie wires which are linked to a tension spring disposed parallel to the axis of the support structure and providing the bias for all the blades. The blades thus take up a V shape but there is no reason in principle why the arrangement should not be inverted so that the blades take up an A shape. The support structure preferably comprises a horizontally extending arm for each blade, the blade being hinged to the end of the arm and each horizontal arm can be of aerofoil section similar to that of the blade.

In the preferred construction the hinge axis is horizontal and tangential to the circle in which it rotates.

The effect of the increasing inclination of the blade as the speed of rotation increases is twofold. Firstly, the inclination of the blade relative to the wind reduces the effective wind speed and secondly, the overall height of the blades is reduced and thereby the total rotational moment is reduced. Consequently, the ratio of the rotational speed to wind speed is smaller for turbine blades inclined away from the vertical than for vertical blades and consequently the rotational speed increases more slowly with increasing wind speed than it would for a turbine with fixed blades. The maximum centrifugal forces acting on the blades are thus reduced and this helps to avoid excessive bending stresses. Bending stresses are also reduced with increasing inclination because the moment of the centrifugal force about the point of attachment to the support structure is reduced. For a hinged blade restrained by tie wires the maximum bending stresses are also dependent upon the position of the hinge and the position at which the tie wire is connected to the blade.

Figure 2:
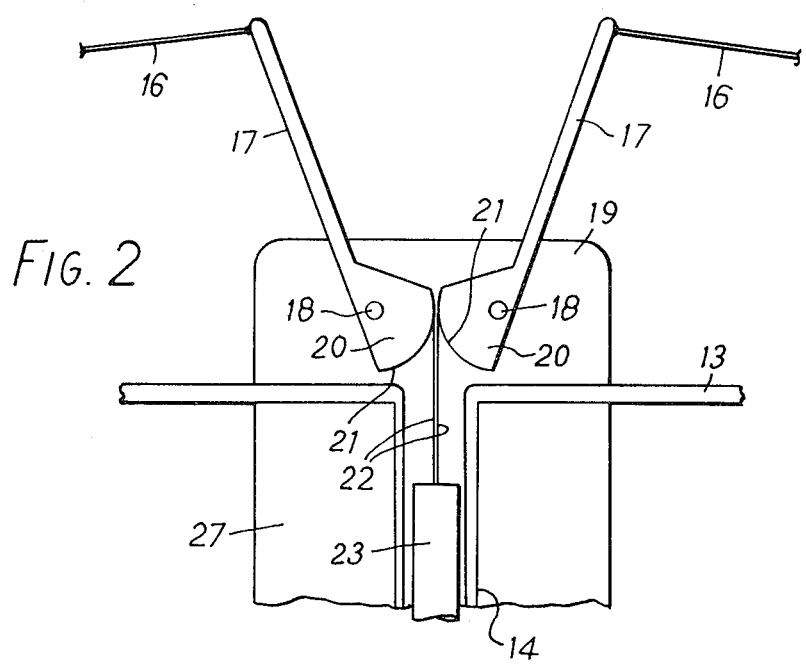
Figure 3:
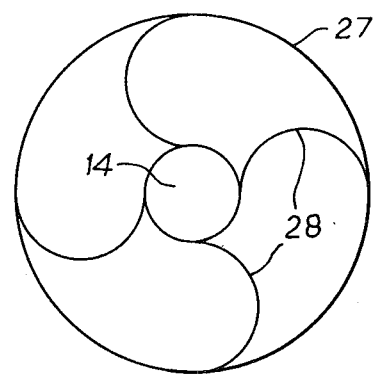
Figure 4:
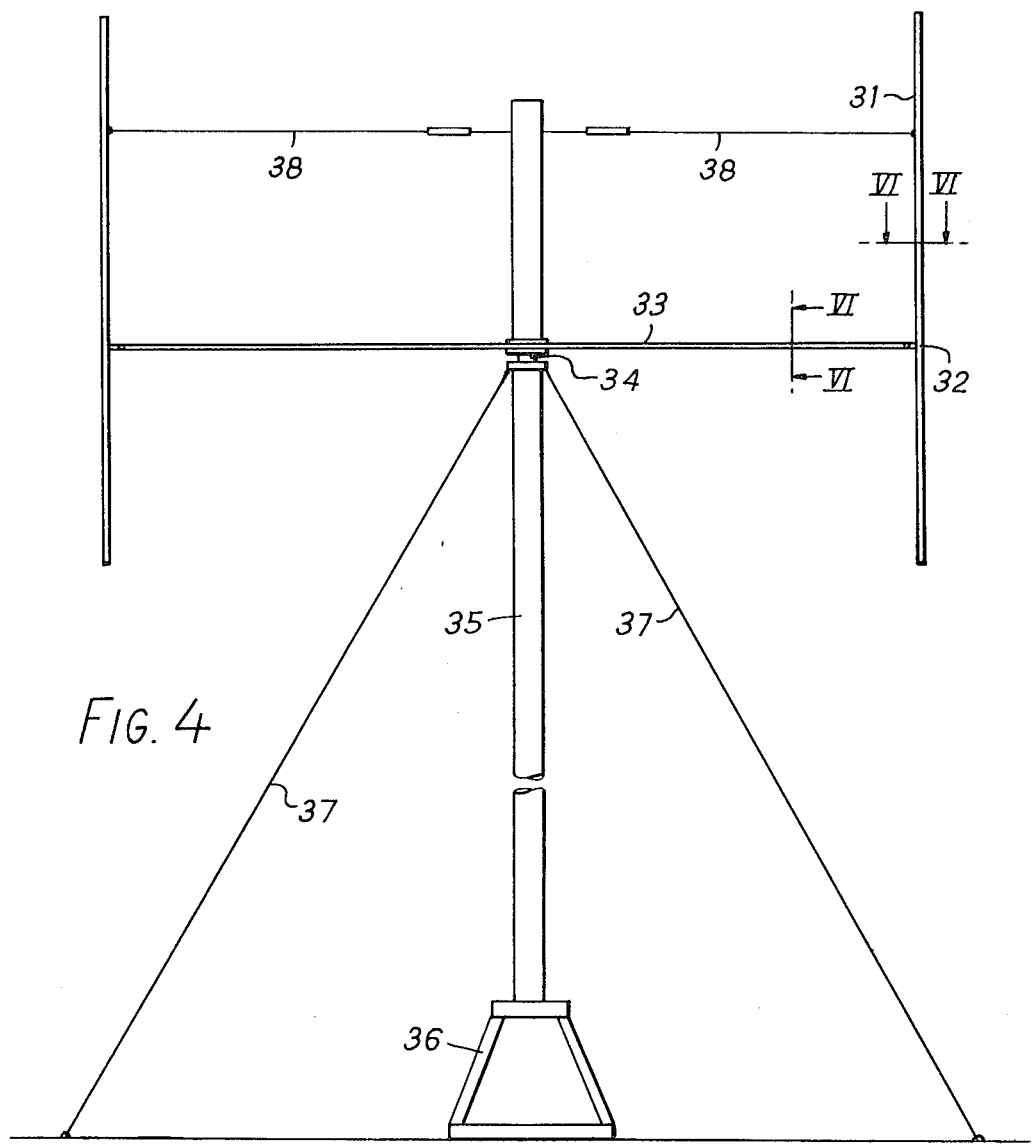
Figure 5:
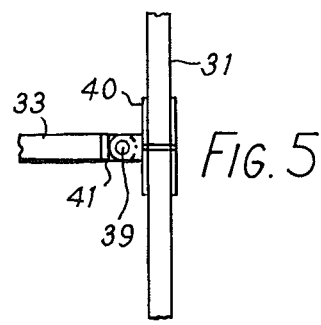
Figure 6:
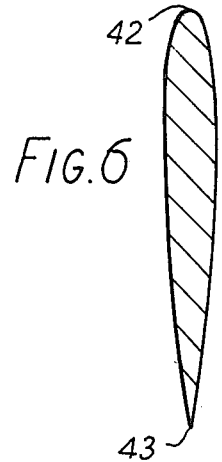

The invention will now be described in more detail with the aid of examples illustrated in the accompanying drawings in which:

FIG. 1 is a schematic elevation of a first embodiment of a vertical axis wind turbine in accordance with the invention, FIG. 2 is a detail of part of the biasing system for the blades of the turbine of FIG. 1, FIG. 3 is a plan view of an auxiliary starter rotor forming part of the wind turbine of FIGS. 1 and 2, FIG. 4 is an elevational view of a second embodiment of a vertical axis wind turbine in accordance with the invention, FIG. 5 is a detail on an enlarged scale of a hinge joining one of the blades of the turbine of FIG. 4 to the supporting arm, FIG. 6 is a section on the lines VI—VI of FIG. 4, and FIG. 7 is a sectional view on a larger scale of the central support of the wind turbine of FIG. 4, the upper and lower parts of the section being separated and placed side by side to fit them on to the sheet.

The wind turbine shown in FIG. 1 has two straight blades 11, each of which is attached by a hinge 12 to the outer end of a horizontally-extending radial arm 13 whose inner end is fixed to a rotatable tubular shaft 14 which carries both the arms 13. The shaft 14 drives a generator 15. The arms 13 both lie in the same vertical plane containing the axis of the shaft 14 and the hinges 12 are both at the same radius from the shaft. The blades 11 are each of aerofoil section NACA 0012 and have constant width and thickness along their length except where thickening is required for the formation of the hinge. The blades may be constructed of high-strength aluminium alloy. The arms 13 are of similar aerofoil section.

The axes of the hinges 12 are horizontal and tangential to the circle described by the ends of the arms 13 as the shaft 14 rotates. Each of the blades is hinged at the centre of its length and since the blades are of uniform chord and thickness the centre of mass of each blade coincides with its hinge axis. Each hinge includes a mechanical stop such that the blades are always inclined to the vertical with their upper ends further from the axis of rotation. Consequently, centrifugal forces, developed as the arms 13 and the blades 11 rotate, tend to increase the inclination of the blades from a minimum angle of inclination to the vertical $\theta$ of 10° (determined by the hinge stop) up to a possible maximum value of $\theta$ = 90°. At this limit value, with the blades extending in the same direction as the arms 13, the wind exerts only a small resultant driving torque and consequently this condition is not useful in normal running of the turbine.

The increase in inclination of the blades 11 which tends to take place as the speed of rotation of the shaft 14 increases is counteracted by tension wires 16 of high tensile strength steel, the outer end of each tension wire 16 being attached to the respective blade 11 above the hinge 12. The inner end of each tension wire is attached to a respective lever 17 which is biassed by a spring mechanism in such a way that the tension wire 16 applies a torque to its blade 11 which is approximately proportional to the angle $\theta$. As shown in FIG. 2, each of the levers 17 is pivoted at 18 within a casing 19 and has a lower end 20 in the form of a circular sector with an arcuate surface 21. A tension wire 22 is attached to the upper end of the arcuate surface 21 and lies within a groove on the surface 21. The tension wires 22 of the two levers 17 are attached to a single tension spring 23 which lies within the tubular shaft 14. The lower end of the spring 23 is adjustable relative to the shaft 14, in a manner not shown in the drawings, such that when the lever arms 17 are vertical there is no slack in the wires 16 and 22 but no torque is exerted on the blades 11. As the inclination of the blades increases the spring 23 will then exert a torque which increases approximately in proportion to the angle of inclination.

In the event of breakage of one of the wires 16 or 22 while the turbine is in operation, the corresponding blade 11 is free to rotate about the hinge 12 to an approximately horizontal position ($\theta$ = 90°). Since the centre of mass of the blade remains at the hinge there will be no significant out-of-balance forces resulting from the asymmetrical disposition of the blades.

Returning to FIG. 1 it will be seen that the tubular shaft 14 is mounted within a coaxial support tube 24 which is carried by a support framework 25 resting on the ground. The upper end of the support tube 24 has three or more guy wires 26 attached to it to give increased lateral stability.

As with other vertical axis wind turbines the blades must move at a speed considerably in excess of the wind speed and consequently the turbine cannot be started simply by the wind. Once the turbine has been started it will be kept in rotation by the wind and power can be drawn from it, in this case by the shaft 14 driving the generator 15. In other cases the generator may be replaced by a pump or other load. If the generator 15 is part of a power supply system or is connected to an electrical storage system, the starting of the turbine can be effected by using the generator as a motor. To enable the turbine to be started by the wind an auxiliary starter turbine 27 is incorporated which, as shown in the plan view of FIG. 3, has four semi-circular blades 28 fixed to the shaft 14. The auxiliary turbine 27 will thus start rotation of the main turbine even at low wind speeds and when a sufficient wind speed is reached the rotation of the main turbine will be maintained by the wind.

If the turbine diameter, as measured from one hinge (12) to the other, is 3m and the blade chord is 15cm, and if the spring stiffness is chosen so that $\theta$ = 15° when the rotational speed of the turbine is about 120 revolutions per minute, then a turbine of the design indicated in FIG. 1 is calculated to give a power output of about 200W in a 5 m/s wind. Calculations also indicate that the blade angle $\theta$ will be approximately 80° when the rotational speed is approximately 340 revolutions per minute. If the load (15) provides a constant resisting torque a blade angle $\theta$ = 80° will correspond to a wind speed of approximately 40 m/s, and the power output will then be approximately 500W. Meteorological Office data reveals that for most inland locations in England a wind speed of 40 m/s is encountered very infrequently (about once in a hundred years). The magnitude of the peak stress in each blade is largely determined by the bending moments which result from centrifugal forces. Even at the rotational speed which gives a blade angle $\theta$ = 80° this peak stress is well within the limits allowed for high-strength aluminium alloys.

Turning now to the embodiment of FIGS. 4 to 7, this again has a pair of straight aerofoil section blades 31 attached by hinges 32 to horizontal arms 33 which are secured to a tubular shaft 34 mounted for rotation about a vertical axis in a tubular support 35. The foot of the support 35 is mounted on a support frame 36 within which a generator is mounted to be driven by the shaft 34. The upper end of the support 35 is secured by guy wires 37. The first difference from the embodiment of FIGS. 1 to 3 is that each blade 31 is hinged at a point below the centre of its length, the hinge 32 dividing the length of the blade in the proportion of between 3:2 and 2:1. The blades are again restrained against swinging out to the horizontal position by tie wires 38 attached to the upper part of the blade but, as will be explained below, the levers 17 are omitted and the tie wires 38 are connected directly to a single biassing spring.

FIG. 5 is a detail of the hinge joining the blade 31 to the end of the arm 33. A hinge pin 39 which extends horizontally and is tangential to the circle described by the end of the arm 33 joins hinge members 40 and 41 secured respectively to the blade 31 and the arm 33.

FIG. 6 shows the symmetrical aerofoil cross-section of the blades 31 and arms 33. The turbine is assumed to rotate in a clockwise direction, as seen in top plan view, and consequently the rounded leading edge 42 of the blade and arm is to the front on the right-hand side of FIG. 4 whereas the sharp trailing edge 43 would be seen on the left-hand side.

Referring now to FIG. 7 it can be seen that the tubular shaft 34 is supported for rotation within the support tube 35 by an upper bearing 44 and a lower bearing 45. The arms 33 are attached to the upper end of the shaft 34 and above them is mounted a tubular housing 46. The tie wires 38 run over respective pulleys 47 mounted in the housing 46 and pass down through the housing into the interior of the tubular shaft 34, where they are attached to the upper end of a helical tension spring 48. The lower end of the spring 48 is attached to one end of a wire 49 which runs round a pulley 50 fixed at the bottom of the shaft 34 and up through the centre of the spring to an adjusting pulley 51 mounted at the top end of the housing 46. The pulley 51 is placed in this position solely for convenience of access and allows the position of the lower end of the spring 48, and hence the tension in the spring, to be adjusted.

In the embodiment of FIGS. 4 to 7 the centre of mass of the blades 31 is above the hinge 32. Consequently, if one of the tie wires 38 breaks there will be out-of-balance forces acting on the turbine when the corresponding blade has swung out towards the horizontal position. To avoid this dangerous condition a coupling is provided between the two tie wires such that if one fails, with a consequent loss of tension, the other will also be released to enable the second blade to swing out.

The wind turbine of FIGS. 4 to 7 is not provided with an auxiliary starter. By inclining the upper parts of the blades inwards towards the axis of rotation, thus forming an A shape, it is possible to secure rotation of the blades at relatively low wind speeds after which the blades will move to a generally vertical position for normal operation at average wind speeds and then swing outwards when the rotational speed increases beyond the normal operating range to limit the rotational speed at higher wind speeds. For this purpose it would be preferable to have the tubular housing 46 (FIG. 7) shorter, enabling the blades 31 to come close to the axis of rotation.

Whereas the turbines described have straight, rigid, blades, it is possible and may be advantageous to give the blades some degree of flexibility so that their bending increases the inclination of parts of the blades to the vertical and thereby assists in limiting the increase in rotational speed.

The turbines described have two blades but a single blade or three or more blades may be used. In the turbines described the upper ends of the blades swing outwards under the centrifugal forces against the restraining tie wires to form a V shape but the inverse arrangement in which the lower parts swing outwards to form an A shape is capable of operating in an exactly similar manner since it is no different in relation to the wind.

I claim:

1. A wind turbine comprising:
a support structure mounted for rotation about a vertical axis, said support structure comprising a central hub and radially extending arms;
a plurality of aerofoil section blades;
hinge means on each arm attaching one of said blades to said arm at a point dividing the length of the blade into major and minor portions;
a tension element connected to the major portion of each blade; and
a common bias means mounted on said central hub and coupled to each of said tension elements, whereby said bias means control the increase in the angle of inclination of the blades to the vertical as their major portions are acted on by centrifugal force and swing outwards about the hinge means, said increase in inclination reducing the rotational speed for a given wind speed.

2. A wind turbine comprising:
a support structure mounted for rotation about a vertical axis;
a plurality of aerofoil section blades carried by said support structure to rotate about said vertical axis with a blade speed in excess of the wind speed, said support structure comprising radially-extending arms and hinge means on each arm attaching one of said blades to said arm in a region between the ends of the blade, said hinge means allowing said blade to swing about a hinge axis under the action of centrifugal force and thereby increase its angle of inclination to the vertical as the speed of rotation of the turbine increases, said hinge axis and a line joining the leading and trailing edges of said blade both being substantially tangential with respect to said radially-extending arm;
a tension element connected to each blade to counter said swing of the blade; and
a common biasing means located at the center of said support structure and coupled to each of the tension elements for controlling the said angle of inclination.

3. A wind turbine comprising:
a support structure mounted for rotation about a vertical axis;
a plurality of aerofoil section blades carried by said support structure to travel in a circular path around said vertical axis with a blade speed in excess of the wind speed;
hinge means coupling each of said blades to said support structure for swinging movement of the blade about a generally horizontal hinge axis to change the inclination of the longitudinal axis of the blade to the said vertical axis, said hinge means being so constructed that centrifugal forces acting on the blade tend to increase the said inclination and thereby reduce the rotational speed of the support structure;
a tension element connected to each blade; and
a common bias means located at the center of the support structure and coupled to each of the tension elements to control the variation of the said inclination with wind speed.

4. A wind turbine comprising:
a support structure mounted for rotation about a vertical axis;
at least one aerofoil section blade mounted on said support structure to travel in a circular path around the said vertical axis; and
means mounting said blade on the support structure to permit changes in inclination of the longitudinal axis of the blade with respect to said vertical axis under the action of centrifugal forces, said blade having resilient bias means acting thereon in opposition to the centrifugal forces to control the change of inclination of the blade as the speed of rotation of the support structure changes with the wind speed.

5. A wind turbine as claimed in claim 4 wherein the blade is hinged to the support structure at a point dividing the length of the blade into major and minor portions and further comprising a tension wire connecting the major portion to the resilient bias means.

6. A wind turbine comprising;
a support structure mounted for rotation about a vertical axis;
at least two aerofoil section blades mounted on said support structure to travel in a circular path around the said vertical axis; and
means mounting each of said blades on the support structure to permit changes in inclination of the longitudinal axis of the blade with respect to said vertical axis under the action of centrifugal forces, each of said blades having resilient bias means acting thereon in opposition to the centrifugal forces to control the change of inclination of the blade as the speed of rotation of the support structure changes with the wind speed.

7. A wind turbine as claimed in claim 6 wherein each blade has a single point of attachment to the support structure.

8. A wind turbine as claimed in claim 6 in which said resilient bia means for each blade comprises a tie wire attached to the blade and coupled to a biasing means common to all the blades.

9. A wind turbine as claimed in claim 8 in which the biasing means comprises a biasing spring mounted at the center of said support structure.

10. A wind turbine as claimed in claim 14 in which each blade is hinged to the support structure to swing about the hinge axis under the action of centrifugal forces, and has its center of mass above the hinge and below the point of connection of the tie wire to the blade.

11. A wind turbine as claimed in claim 9 in which said mounting means comprises hinge means attaching said blade to the support structure at a point intermediate the ends of the blade.

12. A wind turbine as claimed in claim 11 in which said hinge means has a hinge axis which is tangential to said circular path.

13. A wind turbine as claimed in claim 6 wherein the support structure comprises a central shaft and radially-extending arms, said blades being attached to said arms.

14. A wind turbine as claimed in claim 13 comprising hinge means attaching each of said blades to one of said arms at a point dividing the length of the blade into major and minor portions, a tension wire connected to the major portion of each blade and a single spring means coupled to each of said tension wires.

15. A wind turbine as claimed in claim 13 in which each of said arms is of aerofoil section.

16. A wind turbine as claimed in claim 14 in which each of said hinge means has a hinge axis which is horizontal and tangential to the circle described by the hinge means as it rotates with the arm.

* * * * *